Aug. 26, 1969    L. J. MEYER    3,463,074
IN-THE-SHELL PECAN SANITIZER
Filed Feb. 6, 1968    2 Sheets-Sheet 1
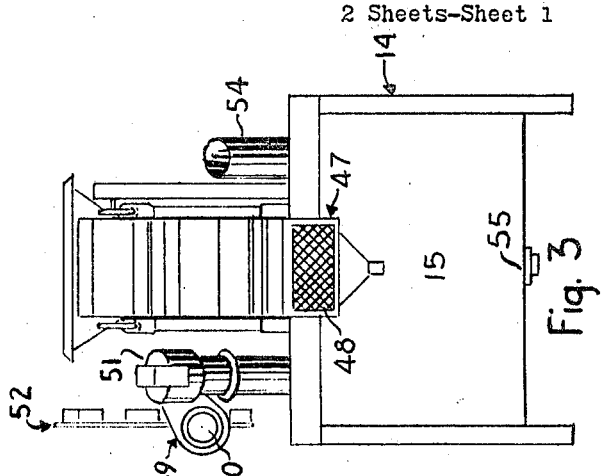
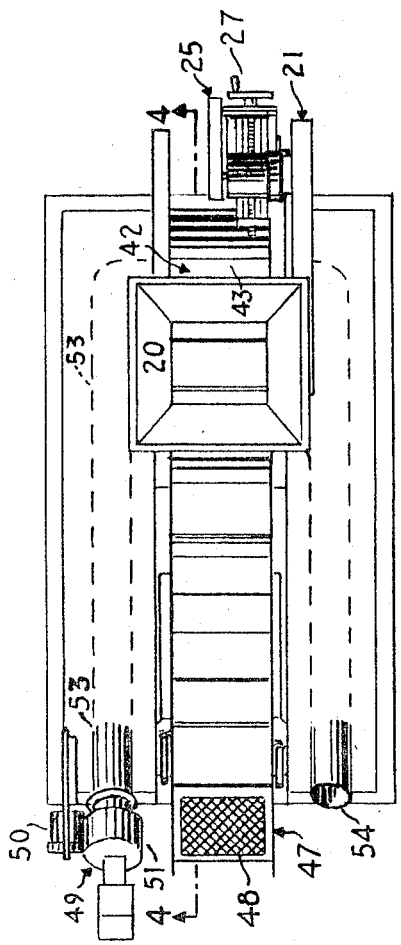
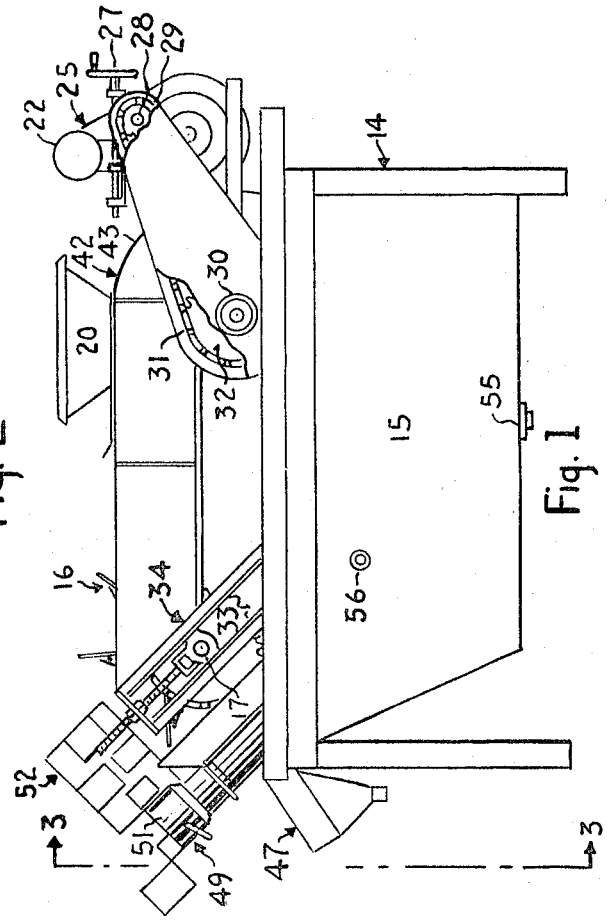
INVENTOR: LEO J. MEYER

INVENTOR: LEO J. MEYER

United States Patent Office 3,463,074
Patented Aug. 26, 1969

3,463,074
IN-THE-SHELL PECAN SANITIZER
Leo J. Meyer, San Antonio, Tex., assignor to Meyer Machine Company, a division of Ramo, Inc., San Antonio, Tex.
Filed Feb. 6, 1968, Ser. No. 703,292
Int. Cl. B65b 55/14; A23l 1/36
U.S. Cl. 99—249                                    5 Claims

ABSTRACT OF THE DISCLOSURE

A hot water sanitizing machine comprising a tank and a thermostatically controlled immersion heater. The pecans are fed into a hopper and immersed by a variable speed continuous bucket conveyor through the hot water at variable adjustable rates sufficient to kill the E. coli bacteria on the exterior of the shells and casebearer worms in the shells.

---

The machine comprising this disclosure may be constructed in single or multiple units, for the purpose of illustration a single channel unit has been selected. The device includes a support frame on which is mounted the hot water sanitizing tank. The pecans or other type nuts are fed into a hopper and conveyed by an endless looped bucket conveyor through the hot water and sanitized. In the preferred embodiment an electric conveyor drive assembly is utilized driving the conveyor through the variable speed V drive assembly. A worm reduction gear is employed inter-connected by a safety slip drive sprocket, propelling the endless chain and looped bucket conveyor. The period of immersion in the hot water is adjusted by the variable speed drive assembly to an optimum period of time for killing the E. coli bacteria on the exterior of the nut shells and accomplishing the secondary result of killing worms in the shell such as the pecan casebearer. The conditioned sanitized nuts are conveyed from the machine in a typical operation to a series of cracking machines. The sanitizing tank includes an integral thermostatically controlled hot water heater designed to maintain the sanitizing fluid at a predetermined desirable temperature.

Various types of heat sanitizing machines are well known to the canning industry. Hot water and steam, being frequently employed for such purposes.

The practice of containing food items in porous buckets and immersing them in hot water is well known.

In the nut processing industry, the common practice has been to convey the nuts through a bath of supersaturated, chlorinated water.

Difficulties with the present known devices are numerous, such as limitations of the batch type processing equipment. Endless chain conveyors heretofore known in the art are not adapted to the forced immersion of highly buoyant in-the-shell pecans. Steam sanitizing methods are difficult to control and contain in the highly mechanized mass production processing of nutmeats such as pecans. High concentrations of chlorine in water is extremely corrosive to machinery. Chlorine sanitizing is expensive in machinery and materials.

An object of this invention was to develop a looped endless chain bucket conveyor which would forcefully immerse buoyant pecans in hot water.

Another object was to provide a variable speed drive to adjust immersion time for the optimum sanitizing and conditioning of the nuts for cracking.

Another object was to kill the E. coli bacteria on the exterior of the shells as well as worms in the shells.

Another object was to avoid the high costs in maintenance of machinery and equipment resulting from the corrosive effects of chlorine.

Another object was to design an improved endless chain looped conveyor capable of containing and immersing highly buoyant nuts such as pecans.

Other objects and advantages will become apparent to those skilled in the art upon a study of the following detailed description and appended claims. In this regard, particular attention is invited to the following views wherein like referenced characters are utilized to designate identical or equivalent components throughout the various views.

FIG. 1 is a side planned view of the device disclosing the exterior of all major components of the combination.

FIG. 2 is a top planned view further illustrating the major components and their relative arrangement.

FIG. 3 is an end planned view depicting the discharge end of the device taken substantially from the position of line 3—3 of FIG. 1 looking in the direction of the arrows.

Figure 4:
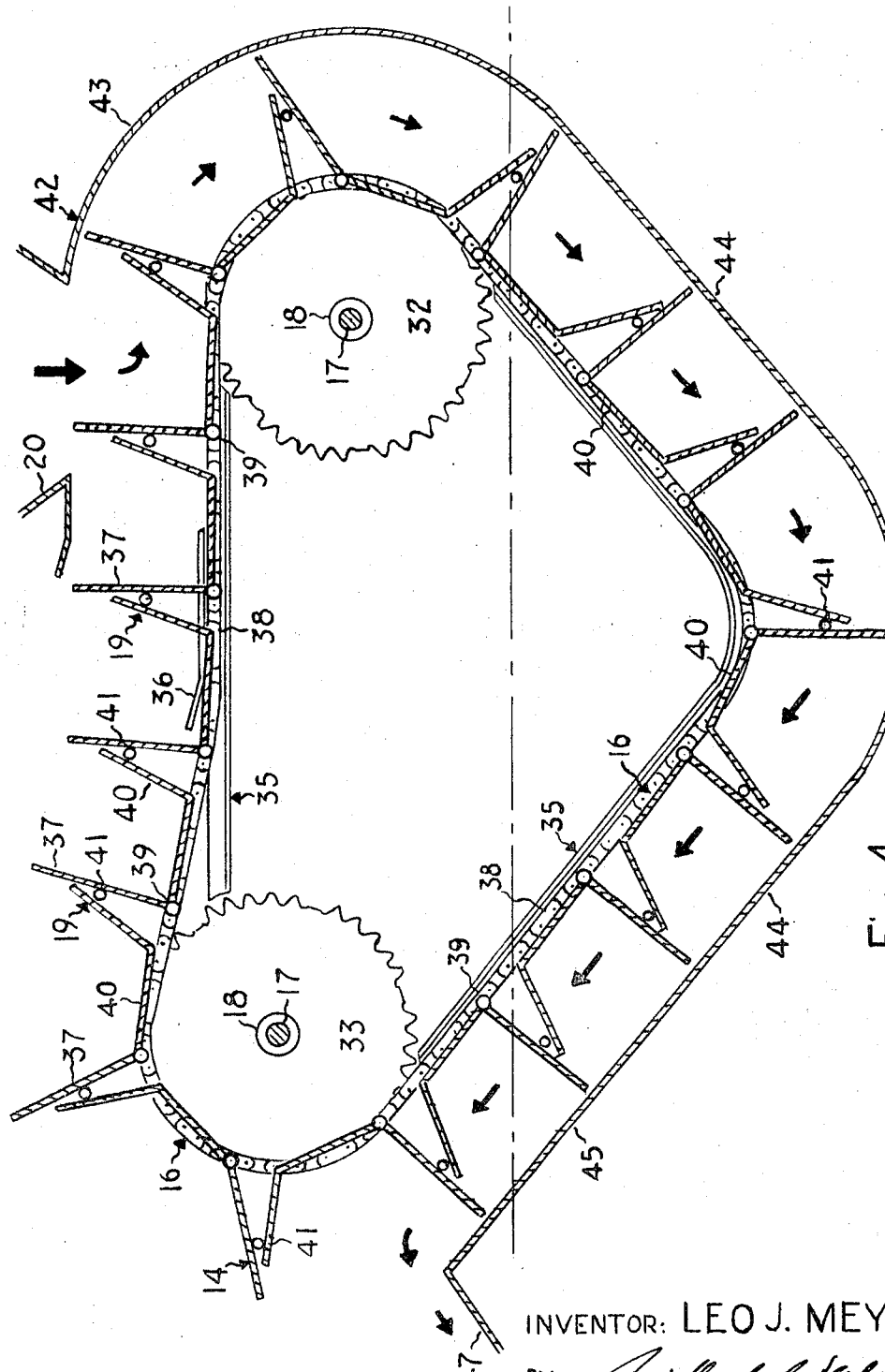
FIG. 4 is a detailed sectional view of the endless chain conveyor system in the general configuration of FIG. 1 taken relatively on line 4—4 of FIG. 2.

In the preferred embodiment, the device, as illustrated in FIG. 1, is constructed on a support frame 14 to which is securely attached a sanitizing tank 15. The looped endless chain conveyor 16, FIG. 4, is mounted in the sanitizing tank 15, with the chain primarily supported by the drive axles 17 which are mounted in drive axle bearing assemblies 18. The looped endless chain conveyor 16 comprises interconnected hinged buckets 19 which pass under and are loaded through the feed hopper 20.

With particular reference to FIGS. 1 and 2, the conveyor drive assembly 21 is normally driven by an electric motor 22 on which is mounted a V belt motor drive pulley (not shown). The drive from the motor is through a variable speed V belt drive assembly 25 which includes a split adjustable pulley (not shown) which receives the V belt (not shown). The spacing of the adjustable pulley (not shown) can be varied by the adjusting crank 27 to obtain the desired rate of drive for the looped endless chain conveyor 16. The drive from the variable speed V belt drive assembly 25 is through a low ratio worm reduction gear (not shown), through a primary drive shaft 28 to a primary drive sprocket 29. The primary drive sprocket 29 is inter-connected with the safety slip torque drive sprocket 30 by means of a link chain 31 or other positive drive means. The safety torque drive sprocket 30 is mounted on a drive shaft 17, FIG. 4, on which is keyed a conveyor drive sprocket 32. The primary support of the discharge end of the looped endless chain conveyor 16 is a conveyor slave sprocket 33.

Referring to FIG. 1, the position of the conveyor slave sprocket 33 may be adjusted by means of conveyor chain adjusting assembly 34. This assembly may be of any conventional construction well known in the art. The looped endless chain conveyor 16 is supported and driven by the conveyor drive sprocket 32 and the slave sprocket 33. Referring to FIG. 4, the position of the endless chain conveyor 16 is stabilized and positioned at points between the sprockets by means of the conveyor track assembly 35. Particular note should be taken of the depressor track 36 which in essence lowers the endless chain conveyor 16 to a proper attitude to pass under the feed hopper 20.

The most salient feature of this invention can well be said to be a new and novel design for the inter-connected hinged buckets 19, best illustrated in FIG. 4. The propelling structure of the inter-connected hinged bucket 19 is in essense the radial drive wall 37 which is hingedly mounted on and secured to the looped linked chain 38 of the endless chain conveyor 16. At substantially the same point is also mounted on this hinge 39 the elbow inter-connecting floor plate 40 which is secured to a radial drive wall 37 by means of the inter-connecting hinge 41.

Reference FIG. 1 and FIG. 4, to accomplish the designed function of receiving buoyant nuts from the feed hopper 20 and forcibly immersing the nuts in a buoyant fluid, a conveyor conduit channel 42 must be employed. The hopper section of the conduit 43 is closed on four sides, while the tank section of the conduit 44 is open on the top to permit free circulation of the hot water around the nuts to be sanitized. The elbow inter-connecting floor plate 40 serves as the top retainer of the buoyant nuts while immersed. The discharge section of the conduit 45 may be constructed either enclosed or as the tank section 44 is constructed.

Particularly referring to FIG. 4, as the buckets move under the slave sprocket 34 the outer extremity of the radial drive wall 38 tends to lag the rate of travel of the looped endless chain conveyor 16 and tilt relatively downward depositing the conditioned nuts in the discharge chute 47. The nuts pass over a perforated screen 48 where any excess water will drain through the screen 48.

The construction of the immersion heater 49 is depicted in FIGS. 1, 2 and 3. The heater may be fired by any of the numerous fuels, however, gas fuel is preferred. There is an electrically driven blower 50 which provides air to the burner unit 51 and moves the heat through the assembly as well as providing the required draft. The heater 49 is provided with a temperature control assembly 52 which assures consistent maintenance of the temperature of the sanitizing fluid at an acceptable level. The heater 49 includes an elongated, immersion heat transfer body 53 inter-connecting the burner unit 51 and the discharge vent 54. One or more drain plugs 55 can be placed in the bottom of the sanitizing tank 15 and if desired an overflow 56 can be provided in the side of the tank to prevent overfilling.

As previously suggested, the device is designed primarily for mass production, cracking and processing of pecans and other nuts. The device may be constructed in single or multiple endless looped chain conveyor assembly 16 to feed one or more cracking lines. The control of the *E. coli* bacteria is a primary concern in pecan processing. This may effectively be accomplished by maintaining the water in the sanitizing tank 15 at 200° Fahrenheit and by adjusting the variable speed V belt drive assembly 25 to keep the nuts immersed for 30 seconds. Longer periods of sanitizing are, of course, possible. The adjusting of the tension on the endless chain conveyor 16 is accomplished in a conventional manner by means of the coveyor chain adjusting assembly 35. The temperature control assembly 52 is adjusted to maintain the sanitizing water at the desired temperature. 200° Fahrenheit is suggested as satisfactory. When pecans are passed through the machine under the above suggested operating conditions, the *E. coli* bacteria on the outer shell is killed as well as casebearer or pecan worms in the shell.

What I claim is:
1. A hot water sanitizing machine;
  (a) a sanitizing tank,
  (b) a looped endless chain conveyor, including a looped endless chain mounted in said sanitizing tank,
  (c) a feed hopper positioned to feed said looped endless chain conveyor,
  (d) a discharge chute positioned to receive the work product of the said conveyor,
  (e) an immersion heater mounted in said sanitizing tank,
  (f) a multiplicity of bucket mounting hinges secured to said endless chain,
  (g) a multiplicity of drive walls extending radially of the hinge axis pivotally mounted on said bucket mounting hinges, and
  (h) a multiplicity of elbow inter-connecting floor plates pivotally mounted on said hinges and each pivotally attached to the trailing side of a leading drive wall.
2. The invention of claim 1 including:
  (a) a drive motor, and
  (b) a variable speed drive intermediate said drive motor and said endless chain conveyor.
3. The invention of claim 1 wherein said immersion heater comprises:
  (a) a burner unit,
  (b) a blower operably attached to said burner unit and adapatable to provide a draft to said burner unit,
  (c) an immersion heat transfer body extending from said burner unit, and
  (d) a temperature control assembly adapted to regulate the flow of fuel to said burner.
4. The invention of claim 1 wherein the said elbowed inter-connecting floor plates are pivotally attached at approximately the mid point of the said trailing side of a leading drive wall.
5. A sanitizing machine:
  (a) a sanitizing tank,
  (b) a looped endless chain conveyor, including a looped endless chain mounted in said sanitizing tank,
  (c) a feed hopper positioned to feed said loop endless chain conveyor,
  (d) a discharge chute positioned to receive the work product of said conveyor,
  (e) sanitizing means contained in said sanitizing tank,
  (f) a multiplicity of bucket mounting hinges secured to said endless chain,
  (g) a multiplicity of drive walls extending radially of the hinge axis pivotally mounted on said bucket mounting hinges, and
  (h) a multiplicity of elbow inter-connecting floor plates pivotally mounted on said hinges and each pivotally attached to the trailing side of a leading drive wall.

References Cited
UNITED STATES PATENTS

| | | | |
|---|---|---|---|
| 1,919,185 | 7/1933 | Chapman | 99—404 |
| 2,253,367 | 8/1941 | Di Prima | 198—170 XR |
| 2,495,673 | 1/1950 | Erwin | 126—360 |
| 2,853,937 | 9/1958 | Peck | 99—404 |
| 3,019,744 | 2/1962 | Carvel. | |
| 3,241,548 | 3/1966 | See et al. | 126—360 |
| 3,270,662 | 9/1966 | Flodin et al. | 99—443 XR |

WALTER A. SCHEEL, Primary Examiner

ARTHUR O. HENDERSON, Assistant Examiner